US012201561B2

(12) United States Patent
Fonte

(10) Patent No.: US 12,201,561 B2
(45) Date of Patent: Jan. 21, 2025

(54) ELEVATED CPR ASSIST DEVICE AND METHOD

(71) Applicant: Michael Fonte, Palmetto Bay, FL (US)

(72) Inventor: Michael Fonte, Palmetto Bay, FL (US)

( * ) Notice: Subject to any disclaimer, the term of this patent is extended or adjusted under 35 U.S.C. 154(b) by 921 days.

(21) Appl. No.: 17/217,129

(22) Filed: Mar. 30, 2021

(65) Prior Publication Data

US 2021/0298970 A1 Sep. 30, 2021

Related U.S. Application Data

(60) Provisional application No. 63/002,563, filed on Mar. 31, 2020.

(51) Int. Cl.
*A61G 1/00* (2006.01)
*A61G 1/04* (2006.01)

(52) U.S. Cl.
CPC .......... *A61G 1/04* (2013.01); *A61G 2200/327* (2013.01); *A61G 2203/70* (2013.01); *A61G 2210/00* (2013.01)

(58) Field of Classification Search
CPC ........ A61G 7/07; A61G 7/072; A61G 13/121; A61G 13/122; A61G 13/1225; A61G 13/1255; A61G 13/129; A61G 13/1295; A61G 1/04; A61G 1/044; A61G 1/00; A61G 2200/327; A61G 2203/70; A61G 2210/00; A61G 13/02; A61G 13/04; A61H 31/004; A61H 1/02; A61H 1/0218;
(Continued)

(56) References Cited

U.S. PATENT DOCUMENTS

| | | | | |
|---|---|---|---|---|
| 2,228,012 A * | 1/1941 | Mackenzie | .............. | A61G 1/00 5/627 |
| 2,442,266 A * | 5/1948 | Davis | ...................... | B64D 9/00 24/68 CD |

(Continued)

FOREIGN PATENT DOCUMENTS

| | | |
|---|---|---|
| DE | 2505444 A1 | 8/1976 |
| EP | 0043983 A2 | 1/1982 |
| WO | 2015127102 A3 | 11/2015 |

OTHER PUBLICATIONS

Moore, Johanna, Head-Up CPR May Improve Neurologically Intact Survival Rates, JEMS, Feb. 14, 2019.

*Primary Examiner* — Adam Baker
(74) *Attorney, Agent, or Firm* — Laurence A. Greenberg; Werner H. Stemer; Ralph E. Locher

(57) ABSTRACT

An elevated CPR assist device is provided which is suitable for attachment to a stretcher to elevate a patient as elevated CPR is carried out on the patient. The device includes a housing and upper and lower device straps extending from the device housing. The upper device strap may be configured for attachment to the upper portion of a stretcher mattress on, or a backrest of, a stretcher. The lower device strap may be configured for attachment to the stretcher frame of the stretcher. At least one of the upper device strap and the lower device strap may be selectively extendable from the device housing. Selected extended lengths of the extendable device strap correspond to respective patient support angles of the stretcher mattress. The elevated CPR device is lengthened between the stretcher frame and the stretcher mattress/backrest to various desired angles, during the performance of elevated CPR.

19 Claims, 11 Drawing Sheets

(58) Field of Classification Search
CPC .. A61H 1/0222; A61H 1/0229; A61H 1/0292; A61H 1/0296; A61H 31/008; A61H 2201/0149; G01B 3/08; G01B 3/1003; G01B 3/1004; G01B 3/1056; G01B 3/1084; G01B 3/56; G01B 3/1041–1046; G01B 2003/1064; G01B 2003/1051; G01B 2003/1028; G01B 2003/1066; G01B 5/02; B60R 22/12; B60R 22/34; B60R 22/33; B60R 2022/3402; A44B 11/28; A44B 11/065; A44B 11/12; A44B 11/125; A44B 11/08; B60P 7/0823–0853; A47C 20/027; A47C 20/04–048; A47D 1/06
USPC ........................................ 33/366.11; 128/845
See application file for complete search history.

(56) References Cited

U.S. PATENT DOCUMENTS

| | | | | | |
|---|---|---|---|---|---|
| 2,802,220 | A | * | 8/1957 | Locke | A47C 15/00 5/633 |
| 3,204,256 | A | | 9/1965 | Stollenwerk | |
| 3,221,735 | A | * | 12/1965 | Goodman | A61H 1/0218 D24/188 |
| 3,255,531 | A | * | 6/1966 | Anderson | G01B 3/1041 242/405 |
| 3,566,422 | A | | 3/1971 | Klippel | |
| 3,804,082 | A | | 4/1974 | Tarjan et al. | |
| 3,877,089 | A | | 4/1975 | Spivey et al. | |
| 3,878,844 | A | | 4/1975 | Tobias | |
| 4,064,574 | A | | 12/1977 | Schnitzler | |
| 4,188,677 | A | | 2/1980 | Zar | |
| 4,485,504 | A | | 12/1984 | Lehmann | |
| 4,506,446 | A | * | 3/1985 | Mitchell | G01B 3/1041 33/767 |
| 4,534,075 | A | | 8/1985 | Schnitzler | |
| 5,471,761 | A | * | 12/1995 | Cheng | G01B 3/1005 33/767 |
| 6,371,119 | B1 | | 4/2002 | Zadini et al. | |
| 6,916,056 | B2 | | 7/2005 | Mitchell et al. | |
| 7,478,445 | B2 | * | 1/2009 | De Vries | A61B 6/0442 5/601 |
| 8,572,778 | B2 | | 11/2013 | Newkirk et al. | |
| 9,044,364 | B2 | | 6/2015 | Dominick | |
| 9,456,938 | B2 | | 10/2016 | Blickensderfer et al. | |
| 9,750,661 | B2 | | 9/2017 | Lurie et al. | |
| 9,801,782 | B2 | | 10/2017 | Lurie et al. | |
| 10,245,209 | B2 | | 4/2019 | Lurie | |
| 10,406,068 | B2 | | 9/2019 | Lurie et al. | |
| 10,406,069 | B2 | | 9/2019 | Lurie et al. | |
| 2004/0068796 | A1 | | 4/2004 | Fletcher | |
| 2005/0011082 | A1 | * | 1/2005 | Smith | A63B 57/357 33/758 |
| 2014/0246533 | A1 | * | 9/2014 | Huang | B60P 7/0846 242/379 |
| 2016/0228326 | A1 | | 8/2016 | Lurie et al. | |
| 2018/0110667 | A1 | | 4/2018 | Freeman et al. | |
| 2018/0125749 | A1 | | 5/2018 | Lurie et al. | |
| 2018/0161192 | A1 | | 6/2018 | Sudell | |
| 2019/0046394 | A1 | | 2/2019 | Lurie | |
| 2020/0230022 | A1 | | 7/2020 | Ilindala | |

* cited by examiner

ELEVATED CPR ASSIST DEVICE AND METHOD

CROSS-REFERENCE TO RELATED APPLICATIONS

The present application claims benefit of Provisional Patent Application No. 63/002,563, filed on Mar. 31, 2020, entitled Elevated CPR Assist Device, that application being incorporated herein, by reference, in its entirety; and the present application claims benefit of Provisional Patent Application No. 63/153,036, filed on Feb. 24, 2021, entitled Devices and Methods for Elevated Cardiopulmonary Resuscitation.

BACKGROUND OF THE INVENTION

Field of the Invention

The present invention relates generally to devices used in cardiopulmonary resuscitation (CPR), and more particularly, to an elevated CPR assist device suitable for attachment to a stretcher to elevate a patient as an elevated CPR procedure is carried out on the patient and a method for using an elevated CPR assist device.

Description of the Related Art

Cardiopulmonary Resuscitation (CPR) is a medical procedure which involves performing repeated compression of a patient's chest in an attempt to restore the blood circulation and breathing of the patient during cardiac arrest. For adults, CPR may involve chest compressions of between 5-6 cm (2-2.4 inch) deep and at a rate of at least 100-120 compressions per minute. Artificial ventilation may simultaneously be provided by either exhalation of air into the subject's mouth or nose, in the case of mouth-to-mouth resuscitation, or by use of mechanical ventilation, in which a device is used to push air into the subject's lungs. The main objective of CPR is to restore partial flow of oxygenated blood to the brain and heart of the patient in order to delay tissue death and extend the brief window of opportunity for a successful resuscitation without permanent brain damage.

The elevated CPR method is a technologically advanced technique for performing device-assisted head-up CPR. The method incorporates raising the head, heart and thorax in a multi-level elevation, in a timed sequence and in conjunction with best practice resuscitation protocols. Implementation of the CPR procedure on a patient with the patient's head, heart and thorax at these elevated positions may help relieve pressure on the brain of the patient. The timing and elevation sequence for the elevated CPR method are scientifically based on preclinical studies which have shown the benefits of a sequence that includes a two minute period of high quality CPR with ACD/ITD or mCPR/ITD with the patient in low supine position followed by a slow progressive rise of 6 cm/min over two minutes to a head height of 22 cm and a thorax of 8 cm.

Preclinical studies have shown that the addition of the elevated CPR method to the existing use of an ITD and ACD-CPR or mechanical CPR significantly increases cerebral perfusion pressure to greater than 80% of normal when two minutes of priming in the lowered position preceded slowly raising the head and thorax of the patient to elevated positions over a two-minute period. The elevated CPR method has been shown to immediately and significantly decrease intracranial pressure while maintaining aortic pressure, reducing the chance of a brain concussion with every compression. Additionally, the elevated CPR method has been shown to significantly increase coronary perfusion pressure to greater than 70% of normal when two minutes of priming in the lowered position preceded slowly raising of the head and thorax to the elevated positions over a two-minute period.

There remains a need in the art, however, for solutions which facilitate conducting the elevated CPR method, and more specifically, for solutions which assist the medical personnel or person conducting the elevated CPR method in easily, rapidly and precisely elevating the subject to the predefined positions or elevations required by the method.

SUMMARY OF THE INVENTION

It is accordingly an object of the invention to provide devices and methods for elevated CPR that addresses the needs set forth above. For example, the invention is directed to an elevated CPR assist device suitable to elevate the head and thorax of a patient while elevated CPR is carried out on the patient and a method for using that elevated CPR assist device.

In one particular embodiment, an elevated CPR assist device is configured for attachment to a stretcher to elevate a patient while elevated CPR is carried out on the patient. In that embodiment, the elevated CPR assist device includes a device housing and upper and lower device straps extending from the device housing. The upper device strap may be configured for attachment to the upper portion of a stretcher mattress on, or a backrest of, a stretcher. The lower device strap may be configured for attachment to the stretcher frame of the stretcher. At least one of the lower device strap and the upper device strap may be selectively extendable from the device housing, and thus adjustable in length. A lower strap attachment element may terminate the lower strap end of the lower device strap, and an upper strap attachment element may terminate the upper strap end of the upper device strap.

Accordingly, the elevated CPR assist device may be deployed in place between the stretcher frame and the head portion of the stretcher mattress or backrest of a stretcher used to support and transport a patient who requires CPR. In one particular embodiment, the CPR assist device may be deployed in place on the stretcher by attaching the lower strap attachment element to the stretcher frame and the upper strap attachment element to the elevated head portion of the stretcher mattress. As the head portion of the stretcher mattress is raised relative to the stretcher frame, the total length of the elevated CPR assist device increases as the lower device strap and/or the upper device strap is extended from the device housing.

In one embodiment of the invention, a plurality of indicator marks are provided on an extendable one of the upper device strap and the lower device strap. Each of the plurality of indicator marks is selectively viewable as the at least one of the lower device strap and the upper device strap is extended from the device housing, to indicate a respective length of the device. The indicator marks thereby indicate the extended lengths of the device strap, and consequently, of the device, which correspond to the respective patient support angles of the stretcher mattress/backrest.

Such indicator markings, in accordance with one embodiment of the invention, are used to guide emergency medical personnel in orienting the head portion of the stretcher mattress at the selected patient support angles (typically 10°, 20° and 30°, respectively) to implement the elevated CPR method on a patient as the patient reclines on the stretcher. For example, in one particular embodiment of the invention, indicator marks are provided on an extendable one of the lower device strap and the upper device strap to indicate the extended lengths of the extendable device strap that correspond to the respective patient support angles of the stretcher mattress relative to the stretcher frame or base.

Other features which are considered as characteristic for the invention are set forth in the drawings, description and appended claims.

Although the invention is illustrated and described herein as embodied in an elevated CPR assist device and method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which like reference numerals refer to like parts throughout the several views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Additionally, although a "stretcher" is described, the invention is not meant to be limited only thereto. It should be understood that the present invention can be used with any type of patient support in which an upper portion or backrest is pivotable relative to a lower portion or frame of the patient support, or to a horizontal plane parallel to the ground.

Shown throughout the figures, the present invention is directed toward an elevated CPR assist device suitable for attachment to a stretcher to elevate a patient as elevated CPR is carried out on the patient in accordance with certain methods of the invention.

Figure 1:
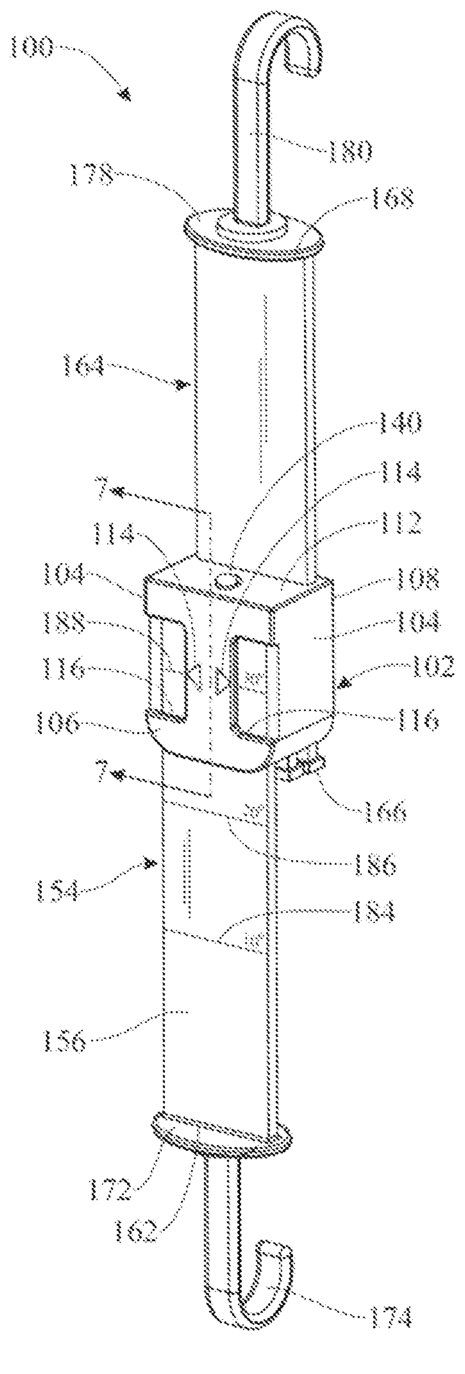
FIG. 1 presents a front isometric view of an elevated CPR assist device in accordance with an illustrative embodiment of the present invention.
Figure 5:
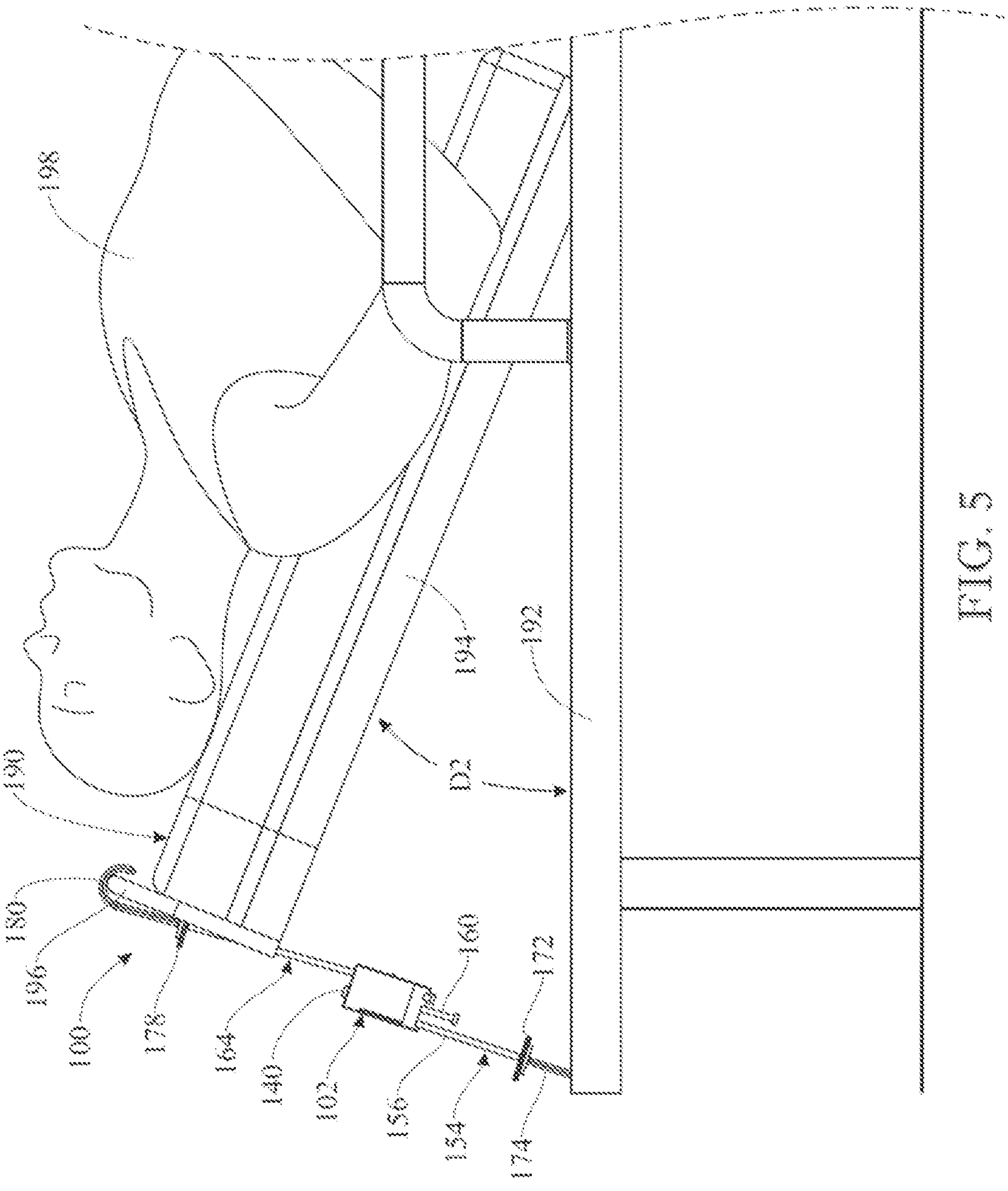
FIG. 5 presents a side view of the elevated CPR assist device of FIG. 1, illustrating lengthwise adjustment of the device to facilitate a second selected patient support angle (D2) of the stretcher mattress with respect to the stretcher frame.
Figure 6:
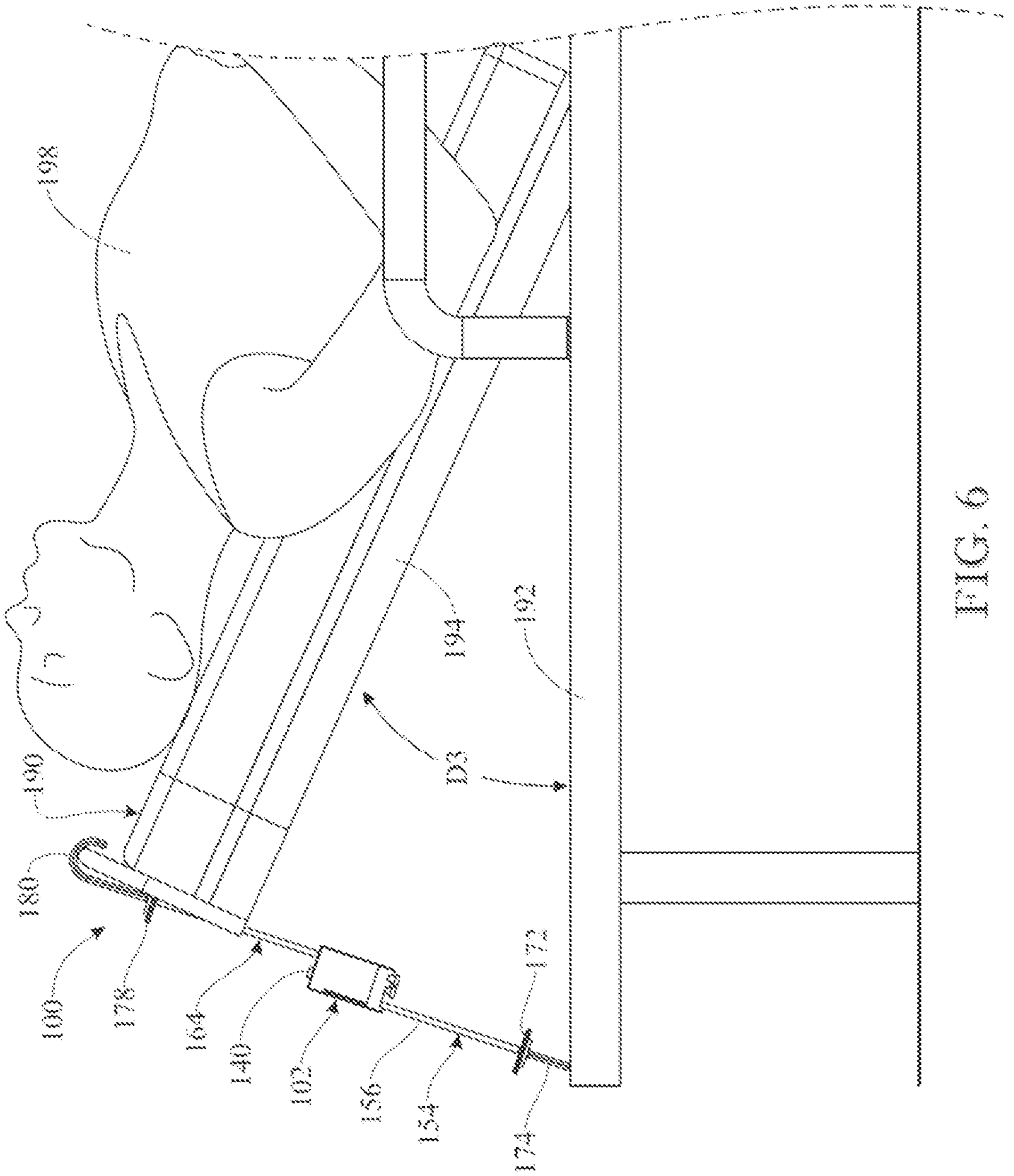
FIG. 6 presents a side view of the elevated CPR assist device of FIG. 1, illustrating lengthwise adjustment of the device to facilitate a third selected patient support angle (D3) of the stretcher mattress with respect to the stretcher frame.
Figure 7:
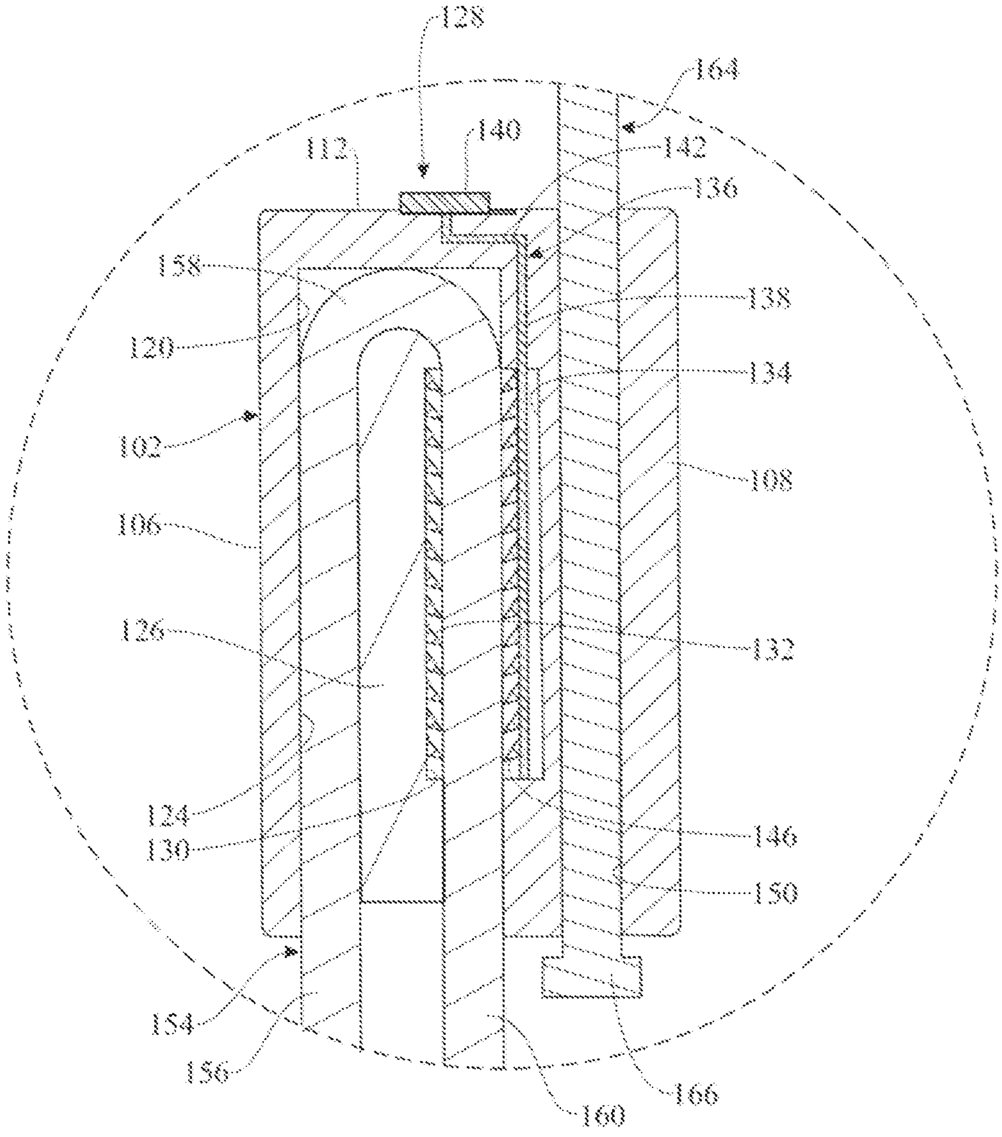
FIG. 7 presents a cross-sectional side elevation view, taken along section lines 7-7 in FIG. 1, of one possible length adjusting mechanism for the lower device strap, with the movable strap teeth of the length adjusting mechanism engaging the lower device strap to prevent lengthwise extension of the lower device strap from the device housing.
Figure 8:
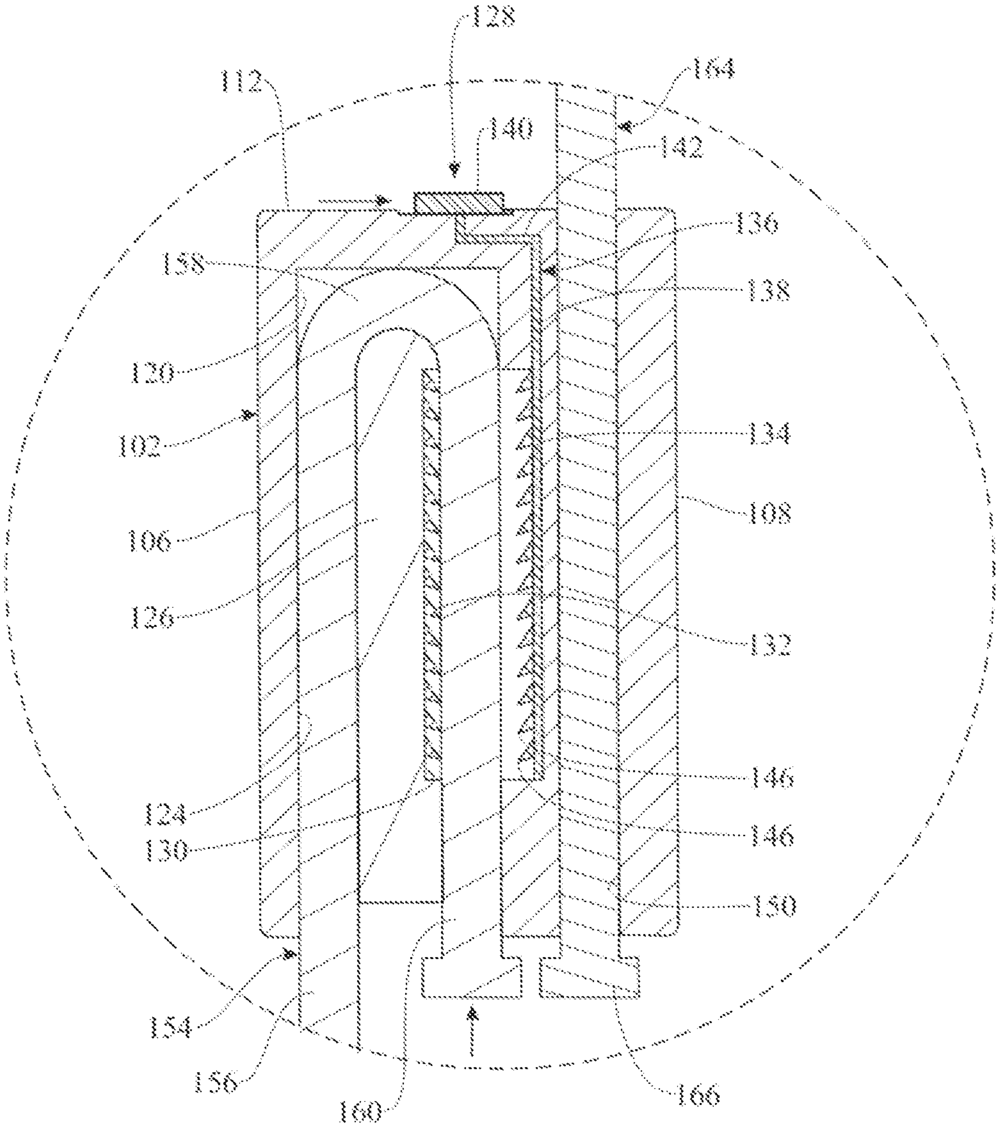
FIG. 8 presents a cross-sectional side elevation view similar to FIG. 7, with the movable strap teeth of the length adjusting mechanism disengaging the lower device strap to facilitate lengthwise extension of the lower device strap from the device housing.

The illustrations of FIGS. 1-8 show an elevated CPR assist device 100 in accordance with a first exemplary embodiment of the present invention. Referring initially to FIG. 1, the device 100 may include a device housing 102. In some embodiments, the device housing 102 may have a pair of spaced-apart housing side panels 104, a housing front panel 106, a housing rear panel 108 and a housing top panel 112. As illustrated in FIGS. 7 and 8, the device housing 102 may have a housing interior 120. A strap support member 126 may extend between the housing side panels 104 through the housing interior 120 for purposes which will be hereinafter described. An upper strap slot 150 may extend through the device housing 102 typically adjacent to the housing rear panel 108 for purposes which will be hereinafter described.

A lower device strap 154 and an upper device strap 164 may extend from the device housing 102, preferably from a top side and a bottom side of the device housing 102, as shown. Each of the lower device strap 154 and the upper device strap 164 may include a heavy-duty strap material. At least one of the lower device strap 154 and the upper device strap 164 may be selectively extendable from the housing interior 120 of the device housing 102. In the non-limiting example illustrated in FIGS. 1-8, the lower device strap 154 is selectively extendable from the housing interior 120, and the length of the upper device strap 164 is fixed relative to the device housing 102. In other embodiments, however, the upper device strap 164 may be extendable from the housing interior 120 and the length of the lower device strap 154 may be fixed relative to the device housing 102, or both the lower device strap 154 and the upper device strap 164 may be selectively extendable from the housing interior 120, typically as will be hereinafter described with respect to the lower device strap 154.

As illustrated in FIGS. 7 and 8, the upper device strap 164 may extend through the upper strap slot 150 in the device housing 102. The lower device strap 154, in turn, may have a main strap segment 156 which extends downwardly from the housing interior 120 typically through a lower strap slot 124 adjacent to the housing front panel 106, a strap loop 158 which extends from the main strap segment 156 and loops over the strap support member 126, and a terminal strap segment 160 which extends downwardly from the strap loop 158 and exits the housing interior 120 adjacent to the main strap segment 156. A lower strap end 162 (FIG. 2) may terminate the lower end of the main strap segment 156. The upper device strap 164 may have a lower strap end 166 and an upper strap end 168 which terminate the lower and upper ends, respectively, of the upper device strap 164.

A lower strap attachment element 174 may be provided on the lower device strap 154. An upper strap attachment element 180 may be provided on the upper device strap 164. As illustrated in FIG. 1, in typical application of the device 100, which will be hereinafter described, the lower strap attachment element 174 may facilitate attachment of the lower device strap 154 to a stretcher frame 192 of a stretcher 190. The upper strap attachment element 180 may facilitate attachment of the upper device strap 164 to a handle 196 or other frame member which supports the upper or head portion of a stretcher backrest or mattress 194. Each of the lower strap attachment element 174 and the upper strap attachment element 180 may include a hook, clip, bracket, hook-and-loop fastener and/or other suitable attachment mechanism which is suitable for the purpose.

The lower strap attachment element 174 may extend from a lower attachment element base 172 which terminates the lower strap end 162 of the lower device strap 154. In like manner, the upper strap attachment element 180 may extend from an upper attachment element base 178 which terminates the upper strap end 168 of the upper device strap 164. In some embodiments, the lower strap attachment element 174 may be rotatable or swivellable with respect to the lower attachment element base 172 and/or the upper strap attachment element 180 may be rotatable with respect to the upper attachment element base 178. In other embodiments, the lower strap attachment element 174 and/or the upper strap attachment element 180 may be fixed relative to the respective lower attachment element base 172 and upper attachment element base 178.

Figure 2:
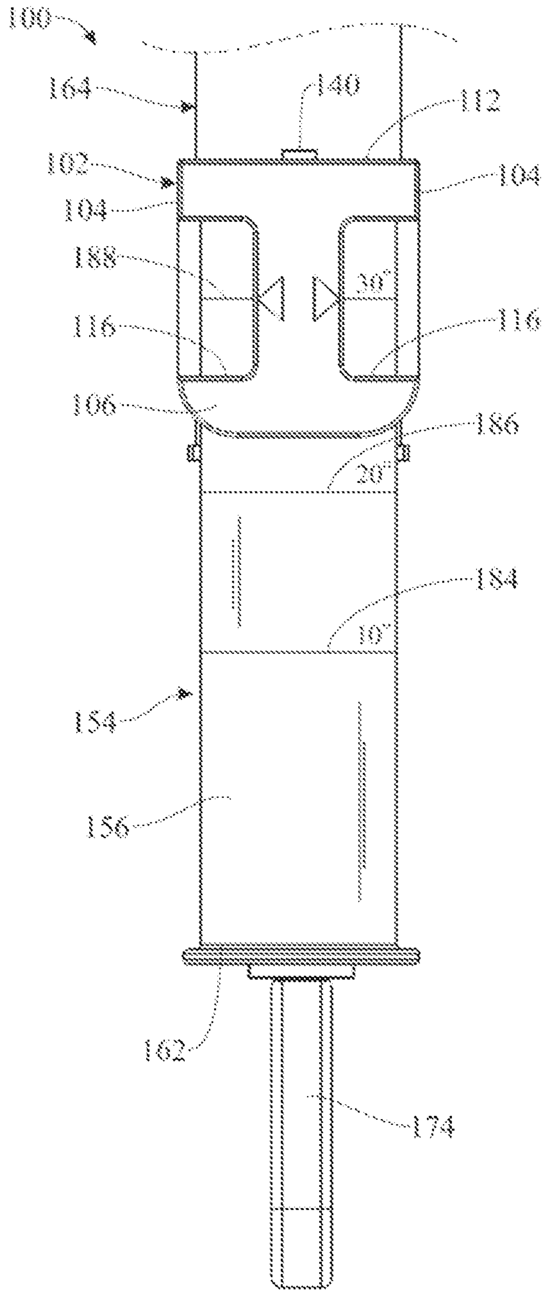
FIG. 2 presents a partial front elevation view of the elevated CPR assist device illustrated in FIG. 1, providing an enlarged view of the device housing and lower device strap.
Figure 3:
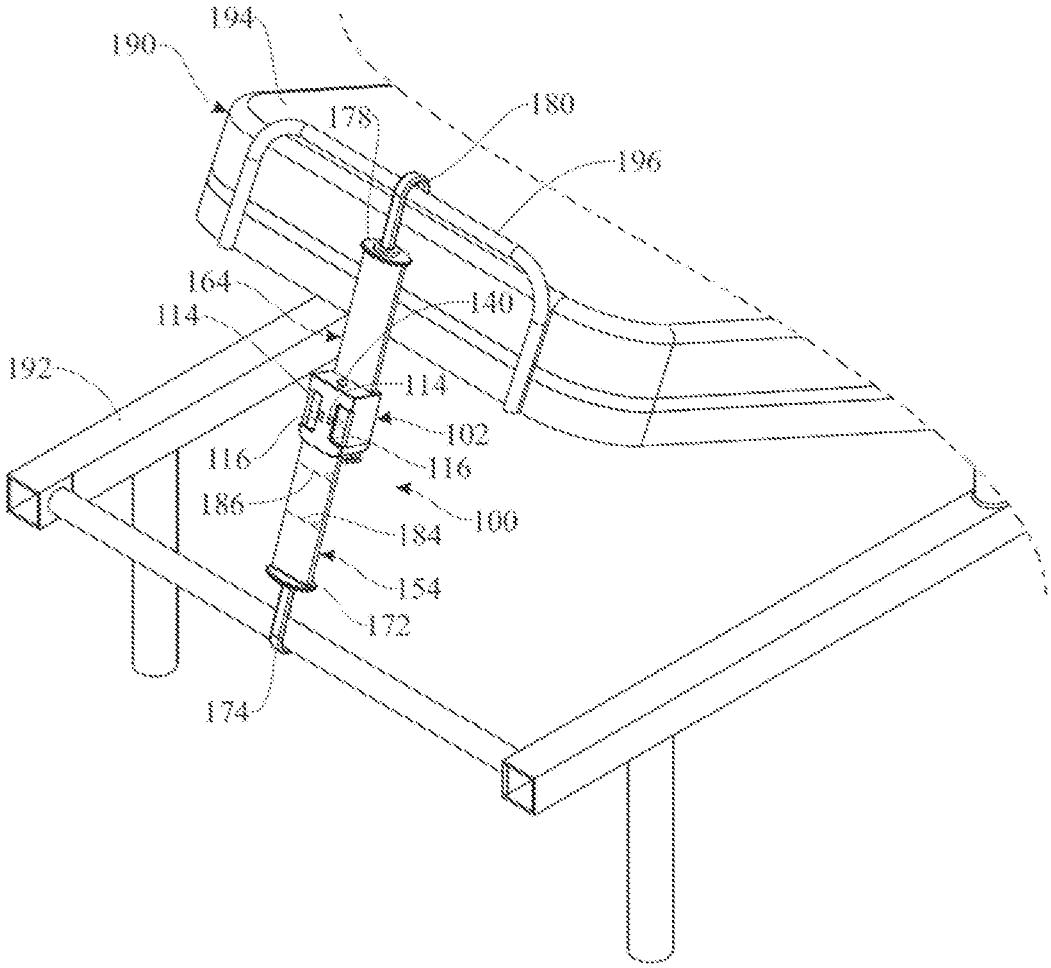
FIG. 3 presents a perspective view of the elevated CPR assist device illustrated in FIG. 1, deployed in place between a stretcher frame and a stretcher mattress of a stretcher in typical application of the device.

As illustrated in FIGS. 1 and 2, a plurality of elevation or indicator marks 184, 186, 188 may be provided on the lower device strap 154 and/or upper device strap 164 which is selectively extendable from the device housing 102. In the non-limiting example illustrated in FIGS. 1-8, the indicator marks 184, 186, 188 are provided on the lower device strap 154. Each indicator mark 184, 186, 188, when visible through the mark viewing slots 116, represents a specific total length of the device 100 that corresponds to a respective particular patient support angle of the stretcher mattress or backrest.

Accordingly, a 10° indicator mark 184, a 20° indicator mark 186 and a 30° indicator mark 188 may be provided on the lower device strap 154 in spaced-apart, sequential relationship to each other. In typical application of the device 100, which will be hereinafter described, as the lower device strap 154 is extended from the device housing 102 the 10° indicator mark 184, the 20° indicator mark 186 and the 30° indicator mark 188 may appear through the mark viewing slots 116 and register with the mark viewing arrows 114 on the housing front panel 106 of the device housing 102 when the upper or head portion of the stretcher mattress 194 is angled at a first angle (D1 in FIG. 4), a second angle (D2 in FIG. 5) or a third angle (D3 in FIG. 6) with respect to the stretcher frame 192 of the stretcher 190, wherein D1, D2 and D3 are equal to or approximately equal to 10°, 20° and 30°, respectively.

As illustrated in FIGS. 7 and 8, a length adjusting mechanism 128 may be provided in the device housing 102 for selective engagement with the extendable strap or straps; for instance, in the present embodiment, the length adjusting mechanism 128 is provided for selective engagement with the extendable lower device strap 154 to secure the lower device strap 154 at the extended length from the device housing 102 corresponding to the selected indicator mark 184, 186, 188 which appears through the mark viewing slots 116 and registers with the mark viewing arrows 114. The length adjusting mechanism 128 may have any design which is suitable for removably engaging and preventing extension of the lower device strap 154 from the housing interior 120 of the device housing 102. For example, in some embodiments, the length adjusting mechanism 128 may include a fixed teeth cavity or slot 130 and a movable teeth cavity or slot 134 provided in the housing interior 120 on opposite and facing relationship to each other on respective sides of the terminal strap segment 160 of the lower device strap 154. A plurality of fixed strap teeth 132 may be provided in the fixed teeth slot 130. A length adjusting user-operable control or lever 136 may include a lever arm 138 which extends through the movable teeth slot 134. A plurality of movable strap teeth 146 may extend from the lever arm 138 of the length adjusting lever 136 in facing relationship to the fixed strap teeth 132. The length adjusting lever 136 may extend through a lever slot 142 in the device housing 102. A lever handle 140 on the exterior of the device housing 102 may engage the length adjusting lever 136 such that the lever handle 140 and length adjusting lever 136 are jointly movable relative to the device housing 102. Accordingly, by manual actuation of the lever handle 140, the length adjusting lever 136 may be shifted between a strap-engaging or strap lock position (FIG. 7) in which the movable strap teeth 146 on the lever arm 138 engage the terminal strap segment 160 of the lower device strap 154 and prevent the lower device strap 154 from extending from the housing interior

120 and a strap-disengaging or strap release position (FIG. 8) in which the movable strap teeth 146 on the lever arm 138 disengage the terminal strap segment 160 and facilitate selective extension of the lower device strap 154 from the housing interior 120.

Figure 4:
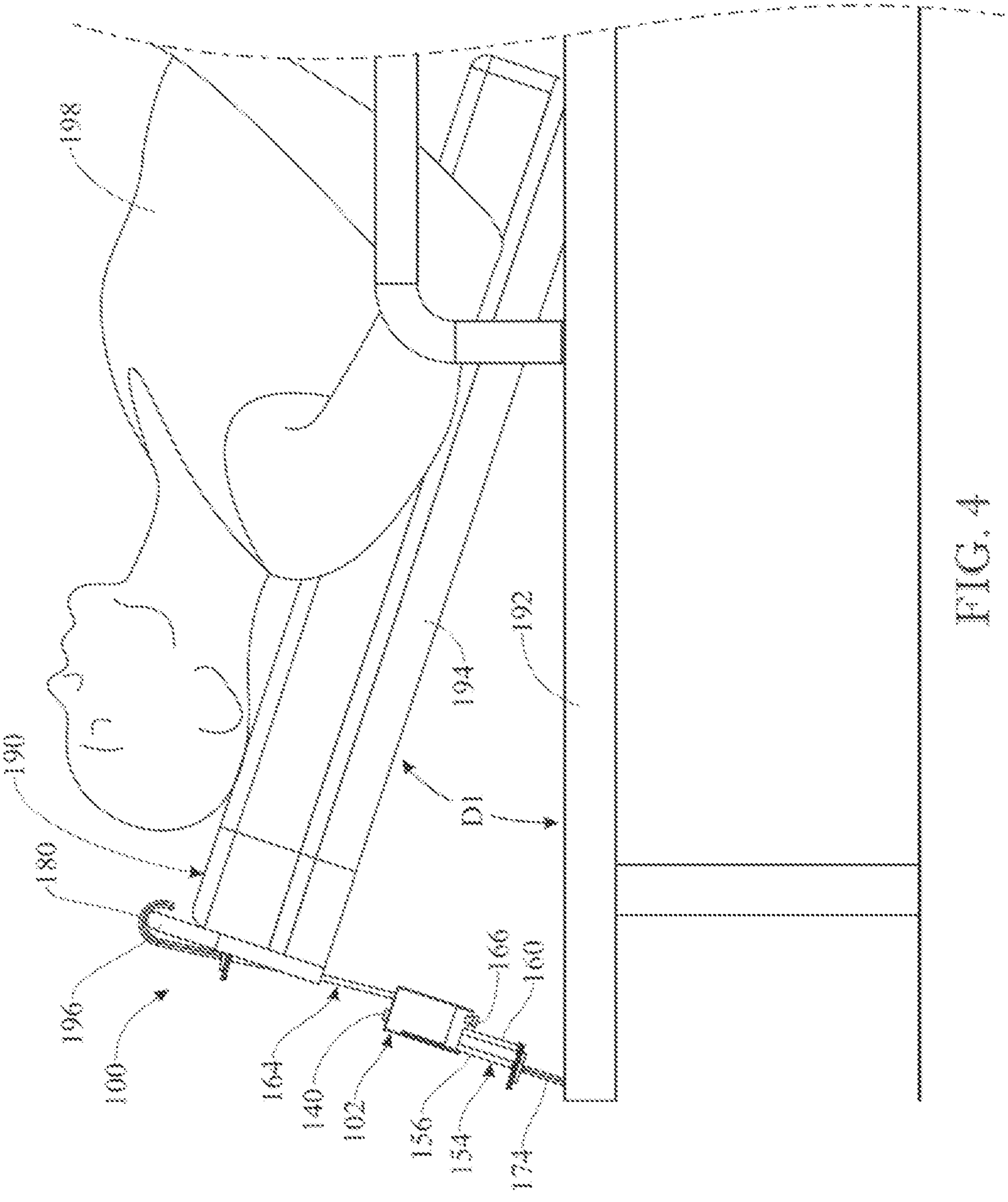
FIG. 4 presents a side view of the elevated CPR assist device of FIG. 1, deployed in place on the stretcher, with a patient reclining on the stretcher mattress and more particularly illustrating typical lengthwise adjustment of the elevated CPR assist device to facilitate a first selected patient support angle (D1) of the stretcher mattress with respect to the stretcher frame.

In accordance with one particular embodiment of the invention, the device 100 may be deployed between the stretcher frame 192 and the handle 196 on the mattress 194 of the stretcher 190 to facilitate implementation of first, second and third stages of an elevated CPR procedure on the patient 198 as the head and torso of the patient 198 recline at respective elevated positions at the first, second and third angles D1, D2 and D3. Implementation of CPR on the patient 198 at these elevated positions may help relieve pressure on the brain of the patient 198. The device 100 may be helpful in retaining the upper or head portion of the mattress 194 at the elevated first angle (D1 in FIG. 4), second angle (D2 in FIG. 5) and third angle (D3 in FIG. 6), respectively, with respect to the stretcher frame 192 as a patient 198 reclines on the mattress 194, as illustrated in FIGS. 4-6. Alternatively or additionally, the device 100 may be used as a visual indicator or reference of when the correct patient elevations or angles have been achieved.

As shown in FIG. 4, the lower strap attachment element 174 may be engaged with a structural member on the stretcher frame 192, and the upper strap attachment element 180 may be engaged with the handle 196 on the mattress 194. As the upper or head portion/backrest portion of the stretcher mattress 194 is lifted or pivoted away from the stretcher frame 192, a selected length of the lower device strap 154 may be extended from the housing interior 120 typically through the lower strap slot 124 (FIG. 8) of the device housing 102 until the stretcher mattress 194 is deployed at the first angle D1 with respect to the stretcher frame 192 in FIG. 4. This may be accomplished by manipulating the lever handle 140 of the length adjusting mechanism 128 from the strap lock position illustrated in FIG. 7 to the strap release position illustrated in FIG. 8 such that the movable strap teeth 146 on the lever arm 138 of the length adjusting mechanism 128 disengage the terminal strap segment 160 of the lower device strap 154, as illustrated in FIG. 8, and simultaneously pulling the main strap segment 156 of the lower device strap 154 from the lower strap slot 124. As illustrated in FIG. 2, when the 10° indicator mark 188 on the main strap segment 156 of the lower device strap 154 registers with the mark viewing arrows 114 through the mark viewing slots 116, the lever handle 140 of the length adjusting mechanism 128 may be returned to the strap lock position, as illustrated in FIG. 7, such that the movable strap teeth 146 reengage the terminal strap segment 160 of the lower device strap 154. The first stage of the elevated CPR procedure may then be carried out on the patient 198.

After the first stage of the elevated CPR procedure is completed, the stretcher mattress 194 may next be raised (i.e., pivoted) from the first angle D1 (FIG. 4) to the second angle D2 (FIG. 5). Simultaneously, an additional segment or length of the lower device strap 154 may be pulled or extended from the device housing 102 after the lever handle 140 on the length adjusting lever 136 of the length adjusting mechanism 128 is again deployed to the strap release position (FIG. 8). Accordingly, the 20° indicator mark 186 may appear through the mark viewing slots 116 in the device housing 102 and register with the mark viewing arrows 114, at which time the lever handle 140 may be returned to the strap lock position (FIG. 7). The second stage of the elevated CPR procedure may then be carried out, after which the stretcher mattress 194 may be raised or pivoted to the third angle D3 (FIG. 6) with respect to the stretcher frame 192. Accordingly, the lever handle 140 may again deployed to the strap release configuration and the lower device strap 154 extended from the device housing 102 until the 30° indicator mark 184 appears through the mark viewing slots 116 and registers with the mark viewing arrows 114. The third stage of the elevated CPR procedure may then be carried out, after which the device 100 may be removed from the stretcher 190.

Figure 9:
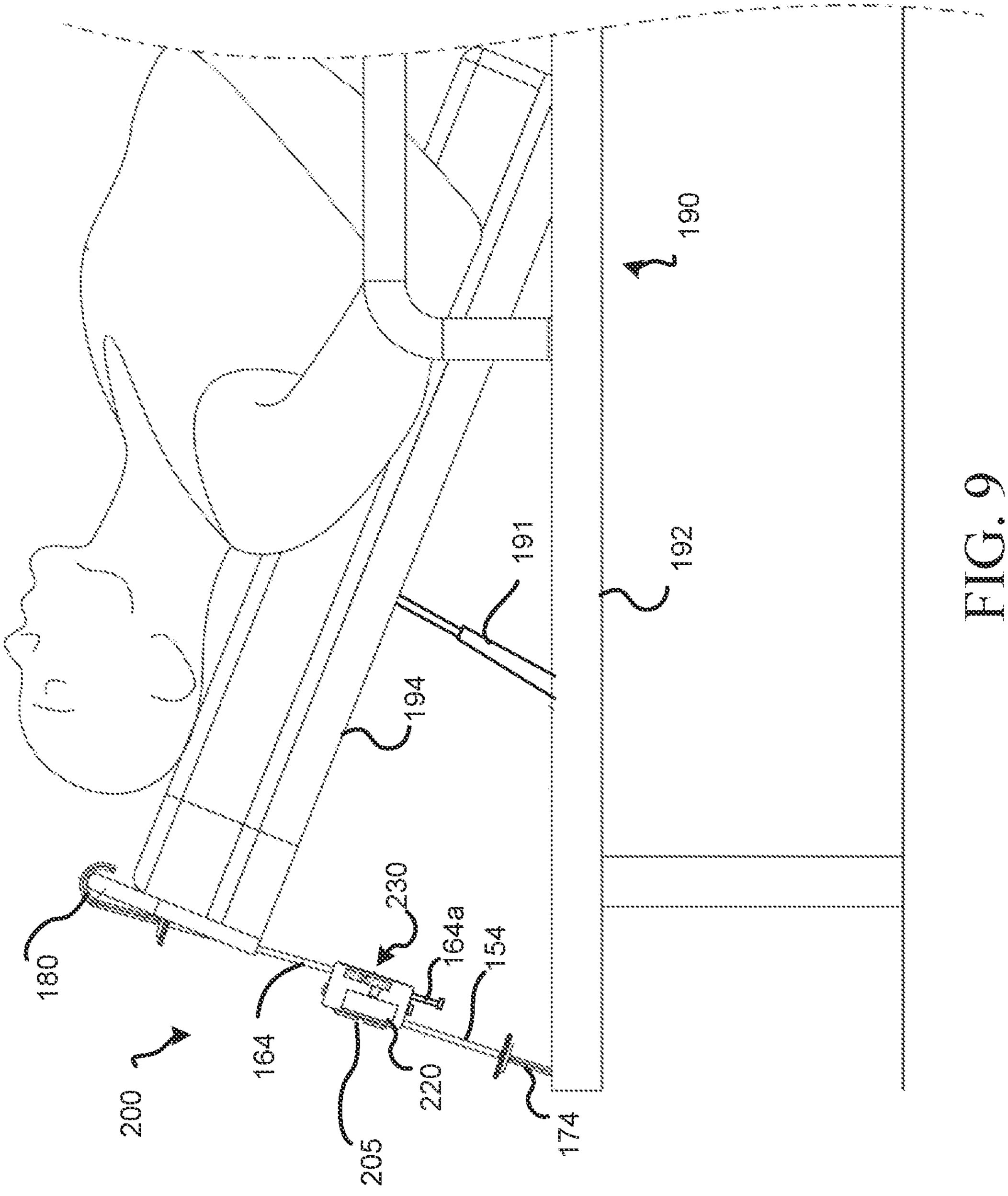
FIG. 9, is a partial, side plan view of a stretcher having a head elevating device in accordance with one particular embodiment of the invention retrofit thereto.
Figure 10:
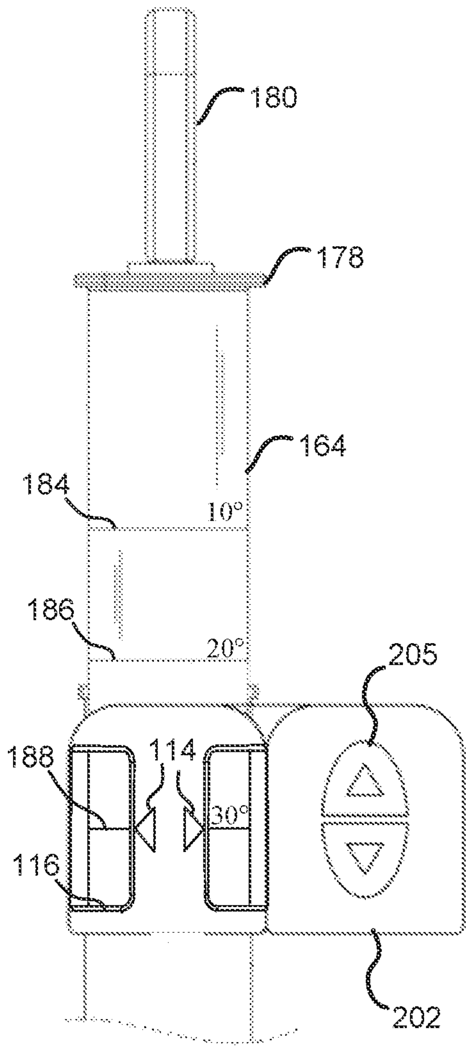
FIG. 10 is a front view of a portion of the head elevating device of FIG. 9, showing additional buttons for controlling the motor.
Figure 11:
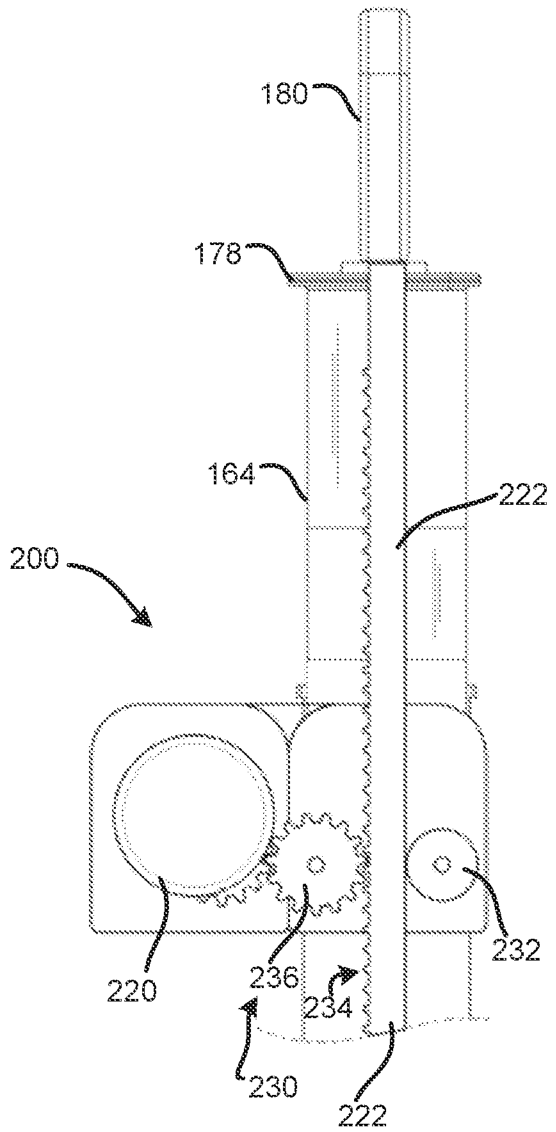
FIG. 11 is a partial, rear cutaway view of the head elevating device of FIG. 9, in which the motor and gears can be seen in accordance with one particular embodiment of the present invention.

Referring now to FIGS. 9-11, there is shown a further embodiment of an elevated CPR assist device 200 that can be secured as a retrofit part to a stretcher 190 and used for performing elevated CPR. In one preferred embodiment of the invention, the device 200 is motorized, but manually controlled using the buttons 205 disposed on the housing 202. Alternately, the device 200 can include a processor, for automatic control of the motor 220, for example, to elevate the stretcher backrest or mattress 194, in steps, at discrete angles (e.g., 10, 20, 30 degrees) automatically. A rack-and-pinion gear system 230 is engaged with the motor 220, for adjusting the angle of inclination of the stretcher mattress 194. More particularly, a strap or band 222 affixed to a back side of the upper device strap 164 incorporates the rack 234 on a face thereof, whereas, operation of the pinion gear 236 serves to pull or release the strap 222, depending on the direction of the motor 220. A guide 232 may be provided to support the rack 234. As the motor 220 turns, the length of the upper device strap 164 extending between the top of the housing 202 and the upper attachment element 180 changes, depending on the direction of operation of the motor 220. An excess amount 164*a* of the strap 164 can extend from the bottom of the housing 202, as illustrated in FIG. 9, depending on the length of the strap portion 164 extending outside the top of the housing 202. However, this is not meant to be limiting, as an excess amount 164*a* can be contained inside the housing 202, if desired, or can be arranged in another way, as described in connection with one or more of the other embodiments described herein.

In one particular embodiment, the lower device strap 154 has a fixed length, and the total overall length of the device 200 changes based on the lengthening or shortening of the strap 164, via operation of the motor 220 and gear system 230. Note that this is not meant to be limiting, as the lower device strap 154 could include the rack 234, instead of, or in addition to, the upper strap 164, as desired. The motor 220 can be powered by an internal battery (not shown) or by an external power source, as desired.

The elevated CPR assist device 200 acts similarly to the device 100 of FIGS. 1-8, in that it attaches to a stretcher 190. In the present particular embodiment, a locking mechanism for the stretcher backrest or mattress 194 has been released. For example, a strap (not shown) can be used to bias a backrest adjustment lever (not shown) open, wherein a gas cylinder 191 of the stretcher 190 biases the stretcher mattress 194 towards an elevated position. The device 200 is attached between a portion of the head end of the backrest 194, and the frame 192 of the stretcher, using attachment mechanisms 174 and 180, as discussed herein. For example, the device 200 can be hooked and/or strapped to the respective portions of the stretcher, as desired. The device 200 operates to increase and decrease the angle of elevation of the backrest 194, thus changing the height of the head and thorax of a patient. In the present illustrated embodiment, the motor 220 and gearing 230 operate to either shorten the total length of the device 200 to pull the backrest 194 down (i.e., counter to the force applied by the gas cylinder 191) or to lengthen the device 200 to allow the gas cylinder 191 to raise the backrest 194 to the full extent permitted by the device 200. Note that other types of gearing or motorized movement can be used without departing from the scope or spirit of the present invention. If desired, the motor may be omitted, and other mechanical mechanisms used to engage the gear system to lengthen or shorten the device 200, such as a winding key or crank, and/or a pull tab at the end of the straps 164 and/or 154.

Additionally, the elevated CPR assist device 200 can include indicator marks 184, 186, 188 on at least one extendible device strap (164 in the embodiment illustrated in FIGS. 9-11) that can be viewed through the mark viewing slots 116. In particular, in the embodiment of FIGS. 9-11, the motor is operated using the desired directional button 205 until the desired mark 184, 186, 188 registers with the mark viewing arrows 114 in the viewing slots 116.

As discussed above in connection with device 100 of FIGS. 1-8, the device 200 may be deployed between the stretcher frame 192 and the handle 196 on the mattress 194 of the stretcher 190 to facilitate implementation of first, second and third stages of an elevated CPR procedure on the patient 198 as the head and torso of the patient 198 recline at respective elevated positions at the first, second and third angles (D1, D2 and D3 of FIGS. 4-6). Implementation of CPR on the patient 198 at these elevated positions may help relieve pressure on the brain of the patient 198. The device 200 may be helpful in retaining the upper or head portion of the mattress 194 at the elevated first angle (D1 in FIG. 4), second angle (D2 in FIG. 5) and third angle (D3 in FIG. 6), respectively, with respect to the stretcher frame 192 as a patient 198 reclines on the mattress 194, as illustrated in FIGS. 4-6. A method for performing elevated CPR, as discussed above in connection with the embodiment of FIGS. 1-8, can similarly be performed using the device 200 by actuating the directional buttons 205, instead of using the lever 140 of FIG. 2, to control the length of the device 200 and select a particular angle of inclination of the head portion of the mattress 194.

Figure 12:
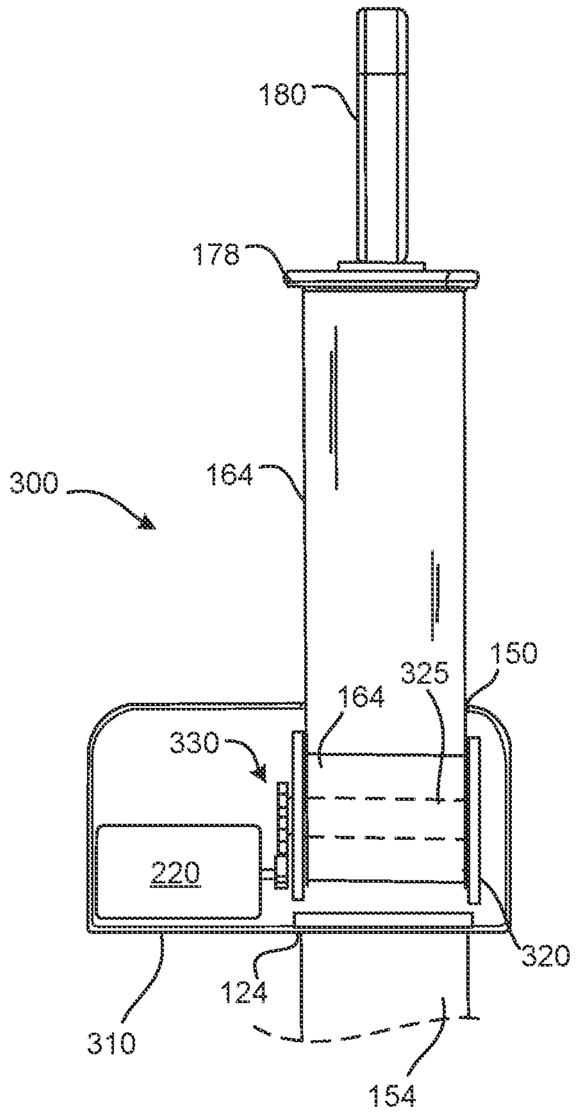
FIG. 12 is a partial, front cut-away view of a head elevating device in accordance with another particular embodiment of the present invention.

A further embodiment of an elevated CPR assist device 300 is illustrated in FIG. 12. The device 300 can be used in the same manner as described in connection with the embodiment of FIGS. 9-11, above. However, in the present particular embodiment, the motor 220 does not use the rack and pinion gearing system 230 of FIGS. 9-11 to lengthen or shorten the device 300. Instead, an end portion of at least one of the of the straps 164 and/or 154 passes through a respective one of the upper strap slot 150 and/or lower strap slot 124 in the housing 310 and is mounted on a reel 320 and/or a spindle 325 in the housing 310. In the embodiment illustrated, the upper strap 164 passes through the slot 150 and is mounted on reel 320 and/or spindle 325, which may be spring-biased, as desired. Motor 220 can be used to rotate the reel 320 and/or spindle 325, to wrap the strap 164 or 154 thereon, or unwrap the strap 164 or 154 therefrom, to shorten or lengthen the device 300. A gear system 330 may be used to interface a spindle of the motor 220 to the spool 320. Alternately, the motor spindle may be used as the spindle 325, if desired. Directional buttons (205 of FIG. 10) can be used to control the direction of the motor 220, and thus, control whether the device 300 is lengthened or shortened. Otherwise, the device 300 operates as described in connection with the device 200 of FIGS. 9-11, in order to adjust the length of the device 300 to elevate the head and thorax of the patient to the desired angles D1, D2, D3 of FIGS. 4-6, for performing elevated CPR.

If desired, a particular program for performing elevated CPR can be used, such as is disclosed in U.S. Pat. No. 10,350,137 to Lurie, that patent being incorporated herein, by reference, in its entirety.

In summary, the invention provides an easy-to-use device that assists medical personnel in elevating a stretcher or other raisable and lowerable structure to increasing angles in order to conduct an elevated CPR method on a patient.

Alternative embodiments are contemplated to those described and illustrated herein. For instance, the shape and size of the housing may vary. The number of straps may be other than two (e.g., three, four, etc.). The straps may be made of different materials. The strap attachment elements may include other fastener mechanisms alternatively or in addition to the aforementioned hooks. The shape and size of the mark viewing slots or spaces may vary; for instance, the mark viewing spaces may be formed as windows having any applicable shape (e.g., square, round, elliptical, etc.). The device may include a strap-securing mechanism configured to stop at each marking (10, 20, 30 degrees) automatically, as the straps are extended from the device housing and the total device length is increased.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents. Accordingly, while a preferred embodiment of the present invention is shown and described herein, it will be understood that the invention may be embodied otherwise than as herein specifically illustrated or described, and that within the embodiments certain changes in the detail and construction, as well as the arrangement of the parts, may be made without departing from the principles of the present invention as defined by the appended claims.

The invention claimed is:

1. A system for performing elevated CPR, comprising:

a patient support having an upper portion that is configured to selectively incline relative to a lower portion of the patient support;

an elevated CPR assist device, including:

a device housing;

an upper device strap extending from a top of said device housing;

an upper attachment element at an end of said upper device strap distal from said device housing, said upper attachment element configured for attachment to the upper portion of the patient support;

a lower device strap extending from a bottom of said device housing;

a lower attachment element at an end of said lower device strap distal from said device housing, said lower attachment element configured for attachment to the lower portion of the patient support;

a mechanism disposed in said device housing and configured to change a total length of the elevated CPR assist device by changing at least one of:

a length of a portion of said upper device strap extending between said top of said device housing and said upper attachment element; or a length of a portion of said lower device strap extending between said bottom of said device housing and said lower attachment element;

a plurality of indicator marks provided on at least one of the upper device strap and the lower device strap, each of the plurality of indicator marks selectively viewable at said device housing as the length of said at least one of the upper device strap or the lower device strap is changed relative to the device housing, each mark of said plurality of indicator marks indicating a predefined length of the elevated CPR assist device;

said elevated CPR assist device removably connected between a free end of said upper portion of said patient support and a free end of said lower portion of said patient support; and an inclination angle of said backrest relative to said frame being defined by a total length of said elevated CPR assist device.

2. The system of claim 1, wherein said device housing further comprises at least one mark viewing slot extending through a front panel of said device housing for viewing an indicator mark of said plurality of indicator marks through said device housing.

3. The system of claim 2, said front panel of said device housing further comprising at least one arrow proximal to said at least one mark viewing slot, said at least one arrow arranged to selectively align with an indicator mark visible through said at least one mark viewing slot, to assist a user in selecting a preset total length of the elevated CPR assist device.

4. The system of claim 1, further comprising a user operable lever configured to shift between a strap engaging position and a strap release position, said strap engaging position preventing a change in total length of the of the elevated CPR assist device, said strap release position configured to permit a change of an amount of the at least one of said upper device strap or said lower device strap extending from said device housing.

5. The system of claim 1, wherein said mechanism includes a fixed teeth cavity and a movable teeth cavity provided inside said device housing in opposite and facing relationship to one another, said fixed teeth cavity including a plurality of fixed strap teeth therein and said movable teeth cavity including a plurality of movable strap teeth disposed therein, a portion of said at least one of said upper device strap and said lower device strap being disposed between said plurality of fixed strap teeth and said plurality of movable strap teeth.

6. The system of claim 5, further comprising a user operable lever movably disposed in said movable teeth cavity, said plurality of movable strap teeth movably being fixed to a portion of said user operable lever in said movable teeth cavity, said user operable lever configured to shift between a strap engaging position and a strap release position.

7. The system of claim 1, wherein said mechanism includes a motor operable to change an amount of the at least one of said upper device strap or said lower device strap extending from said device housing.

8. The system of claim 7, further comprising a gear system for changing an amount of the at least one of said upper device strap or said lower device strap extending from said device housing.

9. The system of claim 8, wherein said gear system includes a rack and pinion gear system that includes a rack attached to at least one of said upper device strap or said lower device strap and a pinion gear controlled by operation of said motor.

10. The system of claim 7, further comprising at least one of a spool or a spindle disposed in said device housing, at least one of said upper device strap or said lower device strap being attached to said at least one of a spool or a spindle, and wherein operation of said motor causes a portion of said at least one of said upper device strap or said lower device strap to be wound on, or unwound from, said at least one of a spool or a spindle, depending on a direction of operation of said motor.

11. The system of claim 7, wherein said motor is operable from a set of directional buttons accessible from said device housing.

12. The system of claim 11, further comprising:

at least one mark viewing slot extending through a front panel of said device housing for viewing an indicator mark of said plurality of indicator marks through said device housing; and at least one arrow proximal to said at least one mark viewing slot, said at least one arrow arranged to selectively align with an indicator mark visible through said at least one mark viewing slot, to assist a user in selecting a preset total length of the elevated CPR assist device using said directional buttons.

13. A method for performing elevated CPR with an elevated CPR assist device, comprising the steps of:

providing a system for performing elevated CPR according to claim 1;

attaching the upper attachment element of the elevated CPR assist device to the upper portion of the patient support;

attaching the lower attachment element to the lower portion of the patient support;

performing a first CPR operation on a patient;

after the performing step, pivoting the upper portion of the patient support relative to the lower portion of the patient support by operating a mechanism of the elevated CPR assist device to change the total length of the elevated CPR assist device; and after the pivoting step, performing a second CPR operation on a patient with the upper portion of the patient support inclined at a different angle relative to the lower portion of the patient support than in the first CPR operation.

14. The method of performing elevated CPR according to claim 13, wherein the pivoting step includes:

changing the total length of the elevated CPR assist device by changing at least one of:

a length of a portion of the upper device strap extending between the top of said device housing of the elevated CPR assist device and the upper attachment element; or a length of a portion of the lower device strap extending between the bottom of the device housing and the lower attachment element.

15. The method of claim 14, wherein each of the plurality of indicator marks selectively viewable at the device housing as the length of said at least one of the upper device strap or the lower device strap is changed relative to the device housing, each mark of said plurality of marks indicating a predefined length of the device.

16. The method of claim 14, wherein the device housing includes at least one mark viewing slot extending through a front panel of the device housing for viewing an indicator mark of the plurality of indicator marks through the device housing, and the device housing further include at least one arrow proximal to the at least one mark viewing slot, and the pivoting step further includes operating the mechanism until the at least one arrow is aligned with an indicator mark visible through the at least one mark viewing slot, to change the total length of the elevated CPR assist device to a preset total length corresponding to a desired angle of inclination of the upper portion of the support housing.

17. The method of claim 16, wherein the plurality of indicator marks includes a first indicator mark, a second indicator mark and a third indicator mark, which indicator marks correspond to a total length of the elevated CPR assist device that produces an inclination angle of the upper portion of the patient support relative to the lower portion of 10°, 20° and 30° respectively, and the method further comprises the steps of performing an elevated CPR operation at each of 10°, 20° and 30°.

18. A system for performing elevated CPR, comprising:
- a patient support having a backrest configured to selectively incline relative to a frame;
- an elevated CPR assist device, including:
  - a device housing;
  - an upper device strap extending from a top of said device housing;
  - an upper attachment element at an end of said upper device strap distal from said device housing, said upper attachment element configured for attachment to the backrest of the patient support;
  - a lower device strap extending from a bottom of said device housing;
  - a lower attachment element at an end of said lower device strap distal from said device housing, said lower attachment element configured for attachment to the frame of the patient support;
  - a mechanism disposed in said device housing and configured to change a total length of the elevated CPR assist device by changing at least one of:
    - a length of a portion of said upper device strap extending between said top of said device housing and said upper attachment element; or
    - a length of a portion of said lower device strap extending between said bottom of said device housing and said lower attachment element:
  - a plurality of indicator marks provided on at least one of the upper device strap and the lower device strap, each of the plurality of indicator marks selectively viewable at said device housing as the length of said at least one of the upper device strap or the lower device strap is changed relative to the device housing, each mark of said plurality of indicator marks indicating a predefined length of the device;
- said elevated CPR assist device attached to said patient support between said backrest and said frame; and
- said patient support including a bias mechanism configured to normally bias said backrest away from said frame, said elevated CPR assist device configured to maintain said backrest at an inclination angle relative to said frame against the natural bias of said bias mechanism with said inclination angle being defined by a total length of said elevated CPR assist device.

19. A method for performing elevated CPR, comprising the steps of:
- providing a system for performing elevated CPR according to claim 18
- attaching the upper attachment element to the upper portion of a patient support;
- attaching a lower attachment element to the lower portion of the patient support;
- performing a first CPR operation on a patient;
- after the performing step, pivoting the upper portion of the patient support relative to the lower portion of the patient support by operating the mechanism to change the total length of the elevated CPR assist device; and
- after the pivoting step, performing a second CPR operation on a patient with the upper portion of the patient support inclined at a different angle relative to the lower portion of the patient support than in the first CPR operation.

* * * * *